D. COLE.
SCREEN.
APPLICATION FILED FEB. 17, 1913.
1,111,217.
Patented Sept. 22, 1914.
2 SHEETS—SHEET 1.
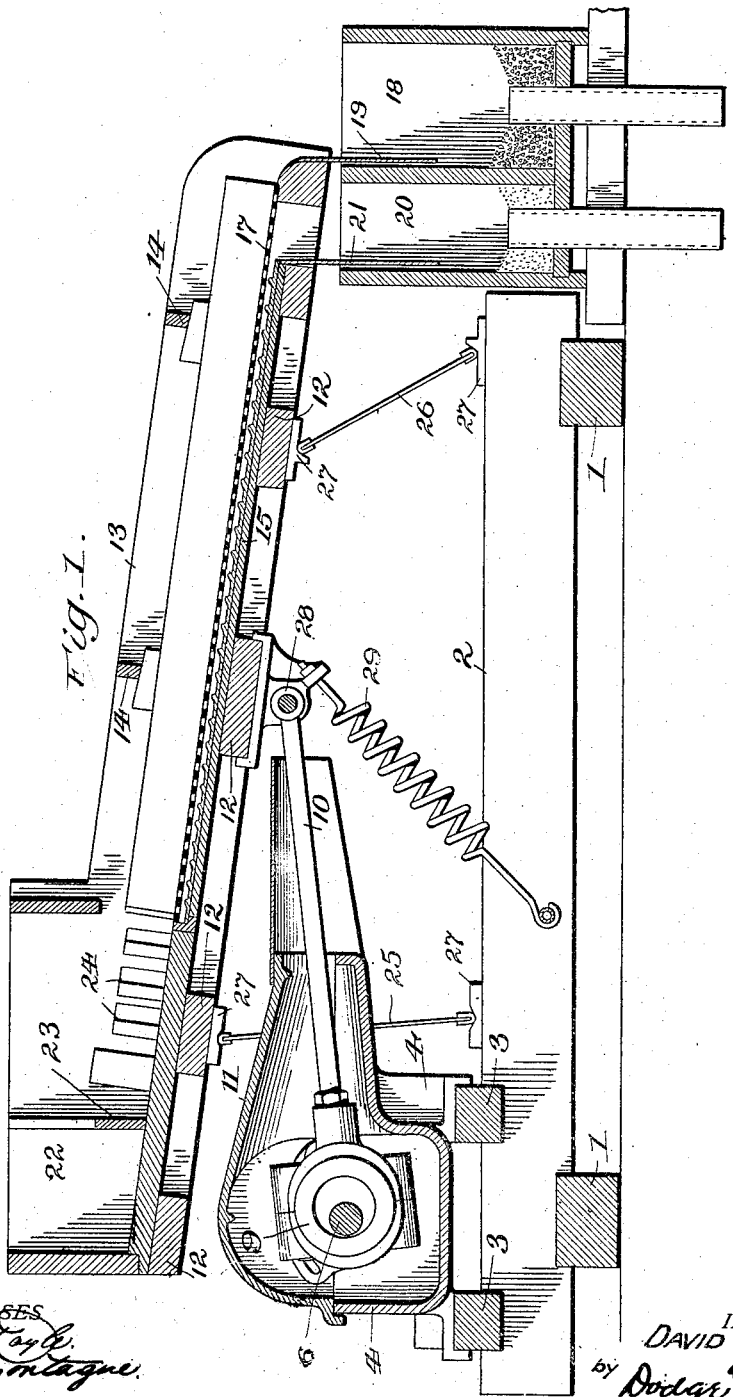
WITNESSES
INVENTOR
DAVID COLE,
by Dodge & Sons
Attorneys D. COLE.
SCREEN.
APPLICATION FILED FEB. 17, 1913.
1,111,217.
Patented Sept. 22, 1914.
2 SHEETS—SHEET 2.
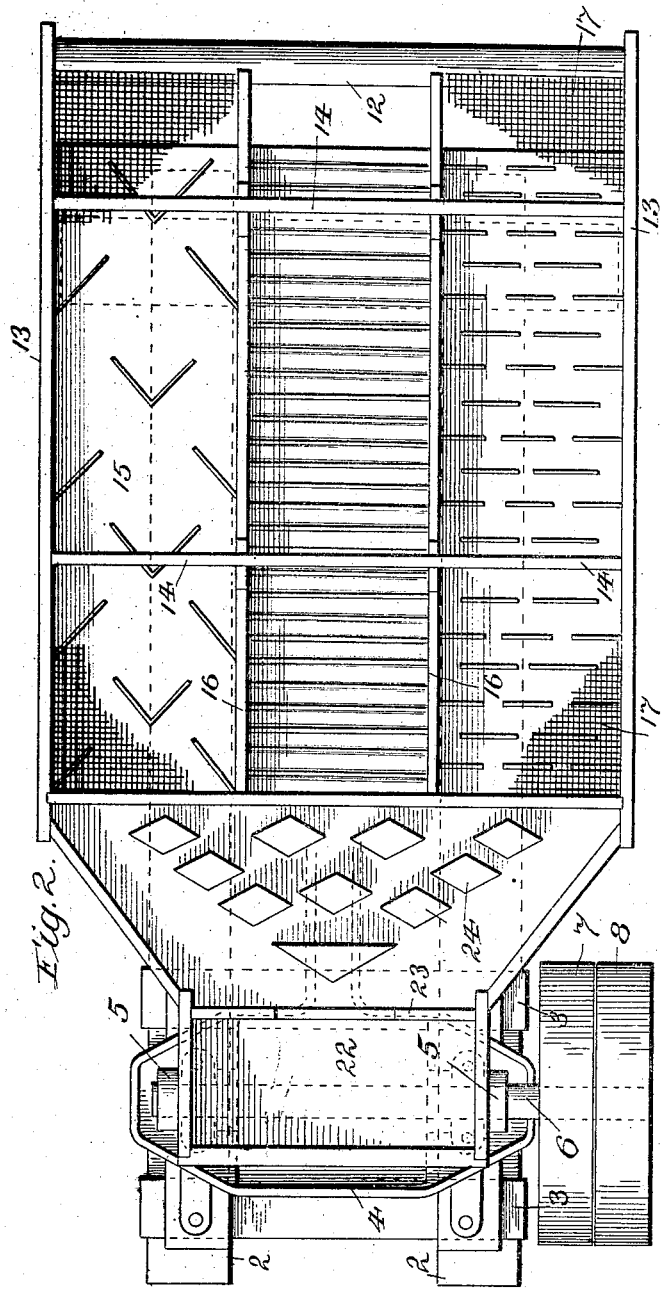
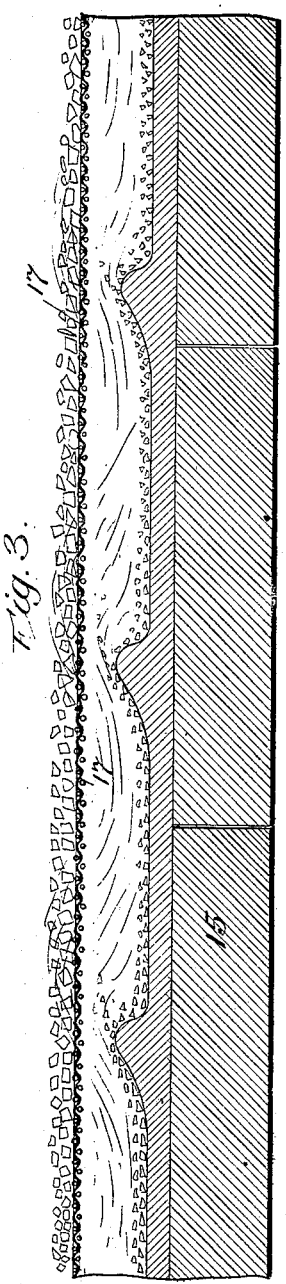
INVENTOR
DAVID COLE,

UNITED STATES PATENT OFFICE.

DAVID COLE, OF TUCSON, ARIZONA.

SCREEN.

1,111,217. Specification of Letters Patent. Patented Sept. 22, 1914.

Application filed February 17, 1913. Serial No. 748,892.

*To all whom it may concern:*

Be it known that I, DAVID COLE, a citizen of the United States, residing at Tucson, in the county of Pima and State of Arizona, have invented certain new and useful Improvements in Screens, of which the following is a specification.

This invention relates to wet screening devices and particularly to those designed for the handling of finely comminuted material. Heretofore great difficulty has been experienced in wet screening fine material, notably finely ground copper ores. Both the rotating and the bumping types of screen, successfully used for the coarser sizes, cannot be successfully used for the finer materials primarily because of mechanical difficulties resulting from the necessary character of the screening surface and the heavy weight of the material thereon. To avoid destructive corrosion, bronze screening material is usually necessary, but perforated bronze plates wear out quickly and are too expensive, while woven wire cloth quickly binds or clogs. These difficulties may be avoided by making use of horizontal screens reciprocated vertically to dip into and rise out of a tank of water, the upward flow of water through the screen lifting and rearranging the particles and the downward flow gently drawing the undersize through the screen. So far as the reduction of wear on the screen and freedom from clogging are concerned these devices are very successful but considerable complication is entailed by the necessity of recovering the undersize from the bottom of the tank, and in securing the necessary progressive feed of the oversize across and from the screen. The devices are large and heavy and the expense in installing and operating them greatly limits their field of economical use.

The purpose of my present invention is to devise a screen of relatively small size, which shall make use of the upward flow and downward reflow of water through the screen surface to effect the rearrangement and screening of the material; and in which such alternate flow and reflow aided by a slight gravity flow of the water along the screen shall effect the necessary feed of both the oversize and undersize.

Broadly stated the device comprises a slightly inclined screen, to which water and solid material are fed at the upper end, and means for causing a pulsing flow and reflow of the water back and forth through the screen as it flows by gravity along the same; the intensity of such pulsing flow preferably increasing toward the discharge or lower end of the screen to compensate for increasing velocity of gravity flow of the water.

The action above defined should be distinguished from a mere washing of the screen by wash water which is thrown against the same by plates or deflectors placed beneath the screen to secure repeated reuse of such wash water. This has heretofore been suggested for steeply inclined screens, but in such devices the upward and the downward flow are localized and the flow through the screen at any given point is virtually unidirectional so that it gives simply a washing action. In my invention the screen and sluice are only slightly inclined and the riffles so retard the gravity flow of the water that the screen is virtually submerged in water. The shaking motion and the riffles produce a pulsing or vibrating flow which is not localized but occurs over the entire screen so that there is a sort of jigging action which assists the screening. It is a flow of this character which I define by the term pulsing.

As the simplest means of carrying out my invention, I make use of an incline box or sluice having a water tight bottom with corrugations or riffle cleats on its upper face. A screen of relatively fine mesh is mounted over and substantially parallel with the bottom. In cases where the riffles extend the full width of the sluice as in the middle sluice of Fig. 2 the screen is spaced from the tops of the corrugations or riffles a distance at least sufficient to permit the passage of the undersize so that in these cases this distance is at least partially dependent on the mesh of the screen. The sluice is mounted to reciprocate longitudinally and vertically, the discharge end having a greater vertical component of motion than the head end. The sluice is vibrated or reciprocated by any suitable head motion such as an eccentric and rod, the arrangement of the screen and riffles and the character of the vibration being such as to cause the desired flow and reflow through the screen, of water flowing down the screen. Granular material together with a suitable quantity of water is fed to the head end of the screen and then flows down over the screen. As the inclination of the screen and sluice is usually between 5° and 10° and never more than 20° to the horizon, there would be little or no gravity feed of the solid material along the screen were it at rest, but the pulsing flow of water back and forth through the screen together with the gravity flow of the water along the sluice and screen, lifts or steps the solid material along the screen at the desired rate, effecting the rearrangement and screening without undue wear on the screen. Toward the discharge end of the screen the rate of gravity flow of the water gradually increases but the increasing vertical component of the vibration neutralizes the effect of this, and prevents an uneven feed of the material.

The screen finds its greatest utility in the finer meshes, usually screens of one quarter inch aperture down to sixty mesh. Satisfactory results have been secured with rates varying from 200 double vibrations per minute for the coarser screens up to 300 for the finer, the amplitude of the vibrations being from one inch to one and one-half inches according to the desired rate of feed which rate increases with the amplitude. The above dimensions are offered as suggestive and not as absolutely limiting.

A practical embodiment of the invention is shown in the drawings, wherein:—

Figure 1 is a vertical longitudinal section of the complete device, with a perforated plate screen; Fig. 2 is a plan view of the same, a wire mesh screen being indicated partly broken away and the eccentric cover and discharge boxes being omitted; and Fig. 3 is an enlarged longitudinal section of a portion of the device showing the form and relative arrangement of the riffle and screen, a wire mesh screen being illustrated.

The device is mounted on a frame consisting of the transverse sills 1 and the longitudinal sills 2. Mounted on cross sills 3 is the casting 4 comprising a case provided with shaft-bearings 5 for a transverse shaft 6. This carries a heavy combined flywheel and fast pulley 7 and a loose pulley 8 serving as a means for driving the machine. The shaft 6 carries an eccentric 9 which by means of a rod 10 imparts reciprocating motion to the inclined sluice and screen. The shaft and rod are protected by a cover 11 of the form shown which fits over the casting 4.

The sluice box is held together by cross sills 12 extending between the sides 13 and by the ties 14 as shown. The floor 15 of the box is water-tight and is carried directly on the cross sills 12. For the greater part of its length measured from the discharge end it is divided into a plurality of sluices (three being shown) by longitudinal partitions 16 each sluice being provided with corrugations or riffles intended to retard the gravity flow of the water and of such form as to cause a surging or pulsing flow of water back and forth through a screen 17 supported above the riffles in the sluice, when the sluice is properly vibrated. The screen may be of any suitable material but preferably is bronze wire mesh.

In the plan view I have indicated three different types of riffle or the equivalent in three sluices, but it is to be understood that in actual practice the riffles would be the same in all three sluices. Any type of riffle adapted to retard the gravity flow of water down the sluice and assist in producing the desired pulsing flow may be used. The best position of the screen with reference to the tops of the riffles is dependent on the form of riffle and may be varied accordingly. As clearly shown in Fig. 1 the screen extends beyond the end of the bottom of the sluice to discharge the oversize into a receiving box 18 a guard strip 19 being provided to prevent oversize from falling into box 20 provided to receive the undersize. A similar guard strip 21 is provided to direct the undersize.

The bottom of the sluice at the head or receiving end is flush with the top of screen 17 and carries a supply box 22 with an overflow side 23 to which material to be screened is fed and from which it flows past the distributing baffles 24 to the screen.

The sluice structure is carried on the rocker strut plates 25 and 26 bearing against thrust blocks or pivot blocks 27 carried on cross sills 12 and sills 2. The rocker plate 25 which is at the head end is inclined only slightly from the vertical so that the head end has a very slight vertical component of motion, but the rocker plate 26 and the discharge end is considerably inclined so that the discharge end has a very considerable vertical component of motion.

The rod 10 is connected to a bearing 28 mounted on one cross sill 12 and a spring 29 is provided to take up any backlash and prevent any tendency for the sluice to jump off its supports.

When the shaft 6 is driven at the proper speed and granular material is fed to box 22 with the proper quantity of water, the water and solid material flow gradually down the screen, the water pulsing back and forth through the screen lifting the over size along in short jumps and drawing the undersize through the screen as will be apparent. Either perforated plate or wire mesh screen material may be used but generally the latter is preferred.

Having thus described my invention, what I claim is:

1. The combination of a slightly inclined screen; means adapted to feed water and granular material to the upper end of said screen; a sluice adapted to cause said water to flow along said screen and maintain the same substantially submerged; means adapted to effect a pulsing flow of said water back and forth through said screen in its flow along the same; and means located adjacent the lower end of said screen adapted to receive and maintain separate the undersize and oversize.

2. The combination of a slightly inclined screen; means adapted to feed water and granular material to the upper end of said screen; a sluice adapted to cause said water to flow along said screen and maintain the same substantially submerged; means operative with greatest intensity adjacent the lower end of said screen adapted to effect a pulsing flow of said water back and forth through said screen in its flow along the same; and means located adjacent the lower end of said screen adapted to receive and maintain separate the undersize and oversize.

3. The combination of a slightly inclined sluice; a slightly inclined screen in said sluice; means adapted to feed water and granular material to the upper end of said screen; obstructing means in said sluice adapted to retard the gravity flow of water therein and maintain said screen substantially submerged; driving and guiding mechanism for said sluice adapted to reciprocate it in a longitudinal path; and means adjacent the lower ends of said screen and sluice adapted to receive and maintain separate the separated undersize and oversize.

4. The combination of a slightly inclined sluice; a slightly inclined screen mounted in and supported by said sluice; means adapted to feed water and granular material to the upper end of said screen; riffles in said sluice beneath said screen adapted to retard the flow of said water and maintain said screen substantially submerged; driving and guiding mechanism for said sluice adapted to reciprocate it in a longitudinal path with horizontal and vertical components of motion; and means adjacent the lower ends of said screen and sluice adapted to receive and maintain separate the separated oversize and undersize.

5. The combination of a slightly inclined sluice; a slightly inclined screen mounted in and supported by said sluice; means adapted to feed water and granular material to the upper end of said screen; riffles in said sluice beneath the said screen adapted to retard the flow of said water and maintain said screen substantially submerged; guiding mechanisms one for each end of said sluice each adapted to constrain the corresponding end to reciprocative motion having horizontal and vertical components, the guiding mechanism for the low or discharge end imparting the greater vertical component; driving mechanism adapted to reciprocate said sluice; and means adjacent the lower ends of said screen and sluice adapted to receive the separated undersize and oversize.

6. The combination of a slightly inclined sluice; a slightly inclined screen mounted in and supported by said sluice; means adapted to feed water and granular material to the upper end of said screen; riffles in said sluice beneath said screen adapted to retard the flow of said water and maintain said screen substantially submerged; guiding mechanism for said sluice adapted to constrain said sluice to longitudinal reciprocative motion having a vertical component of motion adjacent the lower or discharge end; driving mechanism adapted to reciprocate said sluice; and means adjacent the lower ends of said screen and sluice adapted to receive the separated undersize and oversize.

7. The combination of a slightly inclined sluice; a slightly inclined screen mounted in and supported by said sluice; means adapted to feed water and granular material to the upper end of said screen; riffles in said sluice beneath said screen adapted to retard the flow of said water and maintain said screen substantially submerged; swinging supporting arms for said sluice adapted to guide it in longitudinal reciprocative movement; driving mechanism adapted to reciprocate said sluice; and means adjacent the lower ends of said screen and sluice adapted to receive the separated undersize and oversize.

8. The combination of a slightly inclined sluice; a slightly inclined screen mounted in and supported by said sluice; means adapted to feed water and granular material to the upper end of said screen; riffles in said sluice beneath said screen adapted to retard the flow of said water and maintain said screen substantially submerged; swinging supporting arms for said sluice mounted near the ends thereof, the arms adjacent the lower or discharge end being the more inclined from vertical; driving mechanism adapted to reciprocate said sluice; and means adjacent the lower ends of said screen and sluice adapted to receive the separated undersize and oversize.

In testimony whereof I have signed my name to this specification in the presence of two subscribing witnesses.

DAVID COLE.

Witnesses:
L. T. PAYNE,
J. B. COOPER.